(12) United States Patent
Hohner et al.

(10) Patent No.: US 8,764,485 B2
(45) Date of Patent: Jul. 1, 2014

(54) ELECTRICAL PLUG CONNECTOR

(75) Inventors: Manfred Hohner, Viereth-Trunstadt (DE); Helmut Schoepplein, Stettfeld (DE)

(73) Assignee: Wieland Electric GmbH, Bamberg (DE)

( * ) Notice: Subject to any disclaimer, the term of this patent is extended or adjusted under 35 U.S.C. 154(b) by 0 days.

(21) Appl. No.: 13/470,851

(22) Filed: May 14, 2012

(65) Prior Publication Data

US 2012/0276762 A1    Nov. 1, 2012

Related U.S. Application Data

(63) Continuation of application No. PCT/EP2010/006900, filed on Nov. 12, 2010.

(30) Foreign Application Priority Data

Nov. 14, 2009    (DE) ............... 20 2009 015 571 U

(51) Int. Cl.
*H01R 13/648*    (2006.01)
*H01R 13/658*    (2011.01)

(52) U.S. Cl.
CPC .............................. *H01R 13/65802* (2013.01)
USPC .................................................. 439/607.42

(58) Field of Classification Search
CPC ........... H01R 13/65802; H01R 13/658; H01R 9/032; H01R 9/0527; H01R 2103/00; H01R 4/646
USPC ................... 439/607.44, 731, 95, 98, 607.42, 439/607.41

See application file for complete search history.

(56) References Cited

U.S. PATENT DOCUMENTS

| | | | |
|---|---|---|---|
| 4,990,721 A | | 2/1991 | Sheehan |
| 5,662,483 A | * | 9/1997 | Park et al. ..................... 439/101 |
| 5,683,117 A | | 11/1997 | Corbett et al. |
| 6,203,377 B1 | * | 3/2001 | Grek et al. ............... 439/607.44 |
| 6,213,815 B1 | * | 4/2001 | Wu ............................... 439/638 |
| 2004/0011549 A1 | | 1/2004 | Kiely |

FOREIGN PATENT DOCUMENTS

| | | |
|---|---|---|
| DE | 103 11 507 B4 | 9/2006 |
| EP | 1 598 684 A2 | 11/2005 |
| WO | 2004/084359 A1 | 9/2004 |
| WO | 2007/112771 A1 | 10/2007 |

OTHER PUBLICATIONS

International Search Report of PCT/EP2010/006900, Dated Feb. 21, 2011.

* cited by examiner

*Primary Examiner* — Phuong Dinh
(74) *Attorney, Agent, or Firm* — Laurence A. Greenberg; Werner H. Stemer; Ralph E. Locher

(57) ABSTRACT

An electrical plug connector has a housing for accommodating conductors and a separate adapter part with an outer contour matched to an inner contour of the housing and an inner structure for connecting a sleeve conductor serving to encase the conductors. The adapter part additionally contains measures for accommodating a ground contact.

19 Claims, 10 Drawing Sheets

ELECTRICAL PLUG CONNECTOR

CROSS-REFERENCE TO RELATED APPLICATION

This is a continuation application, under 35 U.S.C. §120, of copending international application No. PCT/EP2010/006900, filed Nov. 12, 2010, which designated the United States; this application also claims the priority, under 35 U.S.C. §119, of German patent application No. DE 20 2009 015 571.4, filed Nov. 14, 2009; the prior applications are herewith incorporated by reference in their entirety.

BACKGROUND OF THE INVENTION

Field of the Invention

The invention relates to an electrical plug connector having a housing for accommodating electrical conductors.

An electrical plug connector is composed generally of connecting contacts which are attached to electrical conductors and which are surrounded by a plug connector housing. The connecting contacts of such a plug connector are embodied as plug contacts or as socket contacts depending on their respective function. For each plug connector there is a further mating plug connector which corresponds in terms of plugging, in order to form a plug-type connector coupling. As a result, a plug connector which is provided with plug contacts forms the plug while a mating plug connector which is provided with socket contacts forms the socket of the plug-type connector coupling. In the assembled state, the plug connector is usually plugged to the complementary mating plug connector. The plug connector and mating plug connector then form an electrically conductive plug-type coupling with one another.

Such an electrical plug connector is known, for example, from German patent DE 103 11 507 B4. In this document, electrical conductors are plugged into a cylindrical contact carrier from the rear. From the front, the contact carrier has a certain round plug connector appearance. In order to lock the electrical conductors, pivoting tabs, which are connected to the contact carrier by film hinges, are pivoted in the direction of a line cable which holds the lines together, and are encased by a heat-shrinkable sheath.

Whereas, for example in Germany, it is possible owing to the present standardization situation to lay lines in cable ducts with a customary plastic sheath when performing installation in a building, there is a rule, in particular in Anglo-Saxon and Asiatic countries, that a sleeve line, which is also referred to as a conduit, also has to be used. Such conduits may be configured as metal tubes or even plastic tubes, for example in the form of corrugated tubes.

There is a problem in that sleeve lines are made available with different outer diameters and/or outer structures, to which a corresponding plug connector has to be assigned.

Furthermore, when metal sheaths or metal tubes are used there is frequently a grounding problem and at the same time specifically a connection of the metal sheath to a grounding contact or a metal housing of the plug connector.

Hitherto, the grounding in specific plug connectors such as, for example, the so-called GST 18 plug connector from Wieland Electric GmbH is implemented by virtue of the fact that a multi-plug or multi-socket connecting strip was embedded in a metal housing and the metal sheath (conduit) was introduced on the rear side of the metal housing. In this case a housing edge may be provided which produces a grounding connection between a protective conductor connection and the metal sheath by pressure. Since nowadays efforts are also made increasingly to use plastic housings for the plug connectors in order to fabricate them through large-scale manufacture, the metal sheath becomes increasingly difficult to ground.

SUMMARY OF THE INVENTION

The invention is based on the object of specifying an electrical plug connector which can be used in as versatile a fashion as possible and which permits simple and reliable grounding in conjunction with a metal sheath.

Accordingly, an electrical plug connector is provided with a separate adaptor part which encloses the sleeve line within the housing. The adaptor part has an outer contour which is matched to the inner contour of the housing. In addition, the adaptor part has an inner structure for connecting the sleeve line (conduit) which serves to encase the conductors.

The housing of the electrical plug connector is always the same. This permits consistently identical dimensions of the outer diameter and of the outer contour of the adaptor part. For different sleeve lines all that is then necessary is to make available a number of adaptors with a different, matched inner diameter or correspondingly adapted inner structure. As a result, the electrical plug contact is always the same, while all that is necessary is to make available different adaptor parts for different sleeve lines. In this way, the plug connector according to the invention is suitable for a large number of different sleeve lines. This gives rise to a considerable reduction in individual parts which have to be kept in stock and to a saving in terms of material.

The outer diameter of the adaptor part is matched to the inner diameter of the housing. In addition, the adaptor part has outer contour elements and the housing has inner contour elements which are complementary thereto. In this context, the housing of the electrical plug connector preferably completely accommodates the adaptor part. In the assembled state the housing and the adaptor part are advantageously connected to one another in a form locking and suitably rotationally secured fashion.

In one preferred refinement, the inside of the adaptor part has structure elements which are configured to be complementary to the sleeve line accommodated therein. In addition, the adaptor part has an inner diameter which is matched to the outer diameter of the respective sleeve line.

As a result of the configuration of the adaptor part with a corresponding inner structure and surface contour as well as with an outer diameter and an inner diameter which are matched, on the one hand, to the housing and on the other hand, to the sleeve line, it is possible, for example in the case of a corrugated tube as the conduit, to form a form locking connection which ensures that a corrugated tube remains in an adaptor part even under stress, such as for example tensile stress. For less rough surface structures and surface contours, such as for example macrocontours or microcontours, or even smooth surfaces it is advantageously possible to implement a form locking connection between the surfaces of the adaptor part and of the sleeve line which are to be connected. In particular, a particularly well secured connection is brought about with complete enclosure of the adaptor part by the housing of the plug connector and of the sleeve line by the adaptor.

In one particularly advantageous refinement, the electrical plug connector has a contact carrier part and a housing which is formed from two housing half-shells. The housing half-shells are joined to form the housing with latching hooks and latching openings which lock one in the other. In addition, the contact carrier part has a number of openings which correspond to the number of conductor-end-side connecting contacts. The latching hooks are preferably arranged on the housing half-shells in such a way that the latching hook of the one half-shell and the latching opening of the other half-shell lying radially opposite latch to one another. This refinement ensures a particularly secure and fixed connection as well as simple assembly of the parts of the electrical plug connector. In addition, separate connecting elements such as, for example, screws, are dispensed with.

A further embodiment of the invention is matched to the use of coiled or corrugated-tube-like sleeve lines (conduits). The sleeve line which is embodied as a corrugated tube is inserted here into a single-piece adaptor part. The adaptor part has for this purpose a hollow-cylindrical accommodation space. The sleeve line lies in this hollow-cylindrical accommodation space in such a way that the outer casing of the sleeve line bears against the inner faces of the outer walls of the hollow-cylindrical accommodation space. In a further preferred embodiment, a supporting cylinder projects into the accommodation space at a lateral distance from the outer wall of the accommodation space, which distance corresponds to the outer wall of the adaptor part. The outer face of this supporting cylinder is at such a lateral distance from the inner face of the outer wall that a slit-like gap is formed between the outer wall and the supporting cylinder. This gap forms an accommodation pocket for the sleeve line. In this way, the sleeve line lies in this accommodation pocket supported by the supporting cylinder. The supporting cylinder projects into the sleeve line here in the manner of a collar.

In order to secure the sleeve line in the adaptor part, the adaptor part is penetrated by a fork-like clamp. The fork-like clamp penetrates through the outer wall of the adaptor part and engages with its fork-like projections in a "thread turn" or a corrugation valley of the outer casing, which is coiled or embodied in the manner of a corrugated tube, of the sleeve line. If the sleeve line is metallic, the fork-like securing clamp can perform the double function of the securing clamp, on the one hand, and of the grounding contact, on the other.

In a further refinement, the adaptor part also contains two adaptor half-shells. For their part, these preferably have in turn complementary latching elements. The adaptor half-shells are coupled in an articulated fashion to an annular securing element of the adaptor part, for example by integrally formed-on film hinges. In this context, the securing element expediently has two flat sides which lie opposite one another and to which the adaptor half-shells are coupled in an articulated fashion. In the assembled state, the latching elements, lying opposite one another, of the adaptor half-shells are latched to one another, while the adaptor half-shells preferably terminate in a flush fashion with the securing element. The coupling of the adaptor half-shells in an articulated fashion to the securing element ensures that the latching elements are joined fitting one into the other. The adaptor part therefore constitutes an enclosed component.

In a further refinement, the electrical plug connector has means of accommodating a grounding contact, preferably in the form of a narrow strip of sheet metal. The adaptor part has in this embodiment a connecting opening, for example in the form of an assembly slot, through which the grounding contact engages. The grounding contact is expediently provided at one end with claws which can be bent over and which engage in a comb-like fashion in the outer structure of the then electrically conductive sleeve line. The strip of sheet metal which is provided with grooves or depressions engages in a form locking fashion in the coiled outer casing of the sleeve line. The grounding contact can also protrude over the end side of the sleeve line and form a contact lug and projects into the housing. In the assembled state, the grounding contact can additionally be pressed onto the sleeve line. In particular, a secure and enduring grounding connection of the grounding contact to the sleeve line is ensured by the locking and pressing on. In addition, the claws of the grounding contact can prevent undesired rotation of the sleeve line with respect to the housing of the electrical plug connector.

The advantages achieved with the invention consist, in particular, in the fact that the use of an adaptor part for connecting the sleeve line to an electrical plug connector allows the same plug connector to be used in all cases. For the accommodation of different sleeve lines with different diameters and outer structures all that is necessary is to make available an adaptor part which is matched thereto on the inside. In addition, the adaptor part can serve as a carrier of a grounding contact. This grounding contact forms a grounding connection to a metallic housing part, in particular a metallic housing half-shell or an additional grounding contact of the plug connector in the case of a plastic housing part. The adaptor part can also be at least partially electrically conductive and therefore completely or partially perform the grounding function.

Throughout the application there is use of the phrase form-locking connection. A form-locking connection is one that connects two elements together due to the shape of the elements themselves (e.g. a ball and socket), as opposed to a force-locking connection, which locks the elements together by force external to the elements (e.g. a screw connection providing the external force).

Other features which are considered as characteristic for the invention are set forth in the appended claims.

Although the invention is illustrated and described herein as embodied in an electrical plug connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Parts which correspond to one another are provided with the same reference symbols in all the figures.

Figure 1:
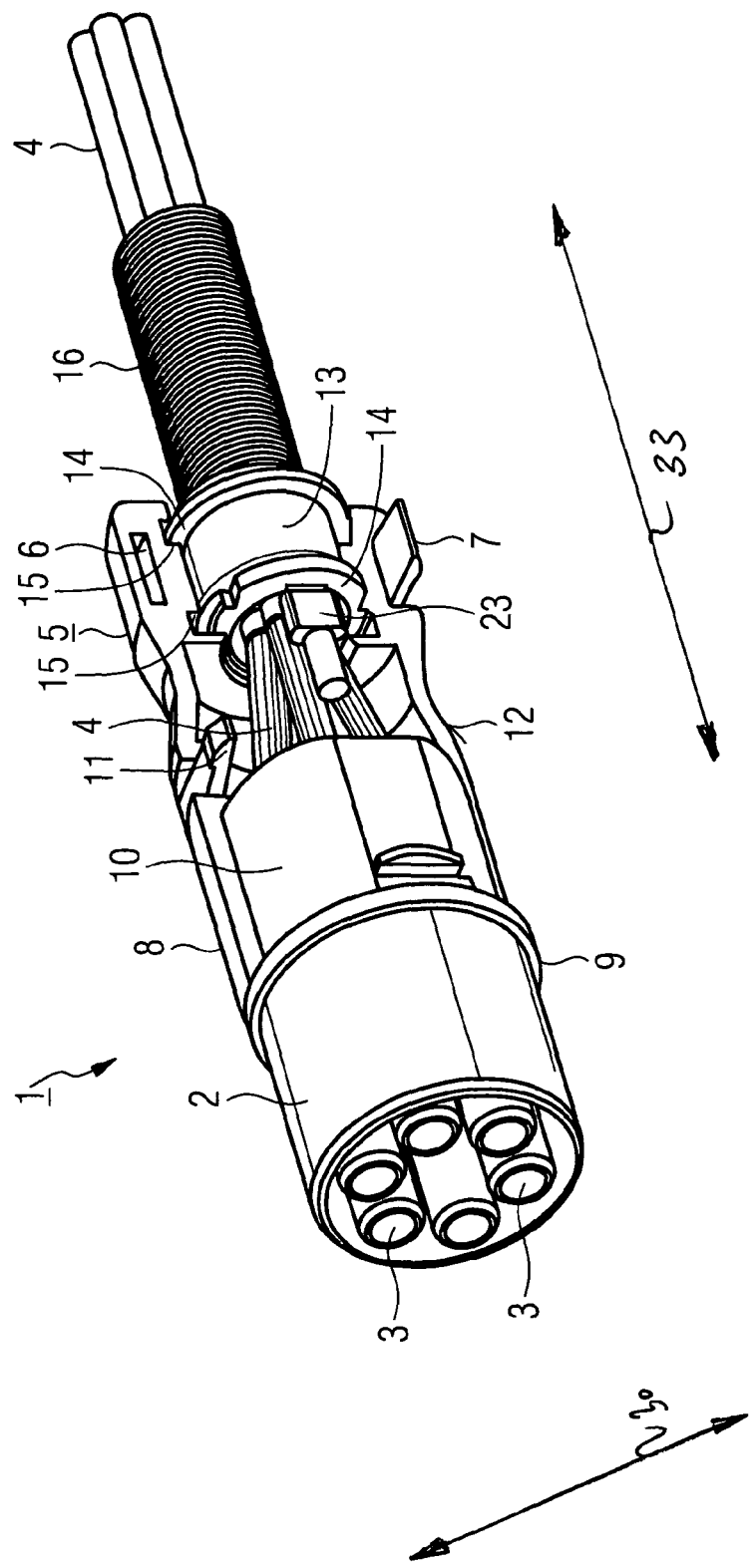
FIG. 1 is a diagrammatic, perspective view of an electrical plug connector, showing a view into a housing half-shell with an adaptor part which lies therein and engages around a sleeve line with securing element conductors according to the invention.

Referring now to the figures of the drawing in detail and first, particularly, to FIG. 1 thereof, there is shown an electrical plug connector 1 having a contact carrier part 2 illustrated in a perspective view. The contact carrier part 2 has socket contact openings 3 at the end side and conductors 4 leading to the socket contact openings 3. A housing half-shell 5 has a latching opening 6 and a latching hook 7 lying radially opposite the latter. The latching hook 7 latches with the latching opening 6 of a complementary, second housing half-shell 5 (not illustrated here). The housing half-shells 5 accommodate the contact carrier part 2 between them and in the assembled state they form, in conjunction with the contact carrier part 2, the housing of the electrical plug connector 1. In this context, cylindrical shell sections 8 of the housing half-shells 5 enclose a carrier shaft 10 of the contact carrier part 2 while bearing against a securing collar 9 of the contact carrier part 2. A further latching hook 11, which faces the shell section 8 and is spaced apart from the other latching hook 7, latches with a latching window 12 (not visible here) of the respective other housing half-shell 5.

On the end side, lying opposite the socket contact openings 3, of the plug connector 1, the housing half-shells 5 accommodate an adaptor part 13. The adaptor part 13 contains two flange-like circumferential collars 14 which are spaced apart from one another. The latter engage in two complementary housing grooves 15, on the inside of the housing, of the housing half-shells 5. The adaptor part 13 therefore has on the outside an outer contour which is matched to the inner contour of the housing half-shells 5. In addition, the outer diameter of the adaptor part 13 is matched to the inner diameter of the housing in the region of the enclosed housing half-shells 5. The adaptor part 13 therefore lies in a form-locking fashion in the housing 5 of the electrical plug connector 1. The adaptor part 13 encloses a sleeve line (conduit) 16 which is a coiled or a corrugated-tube-shape in the exemplary embodiment, the sleeve line 16 in turn enclosing the conductors 4.

Figure 2:
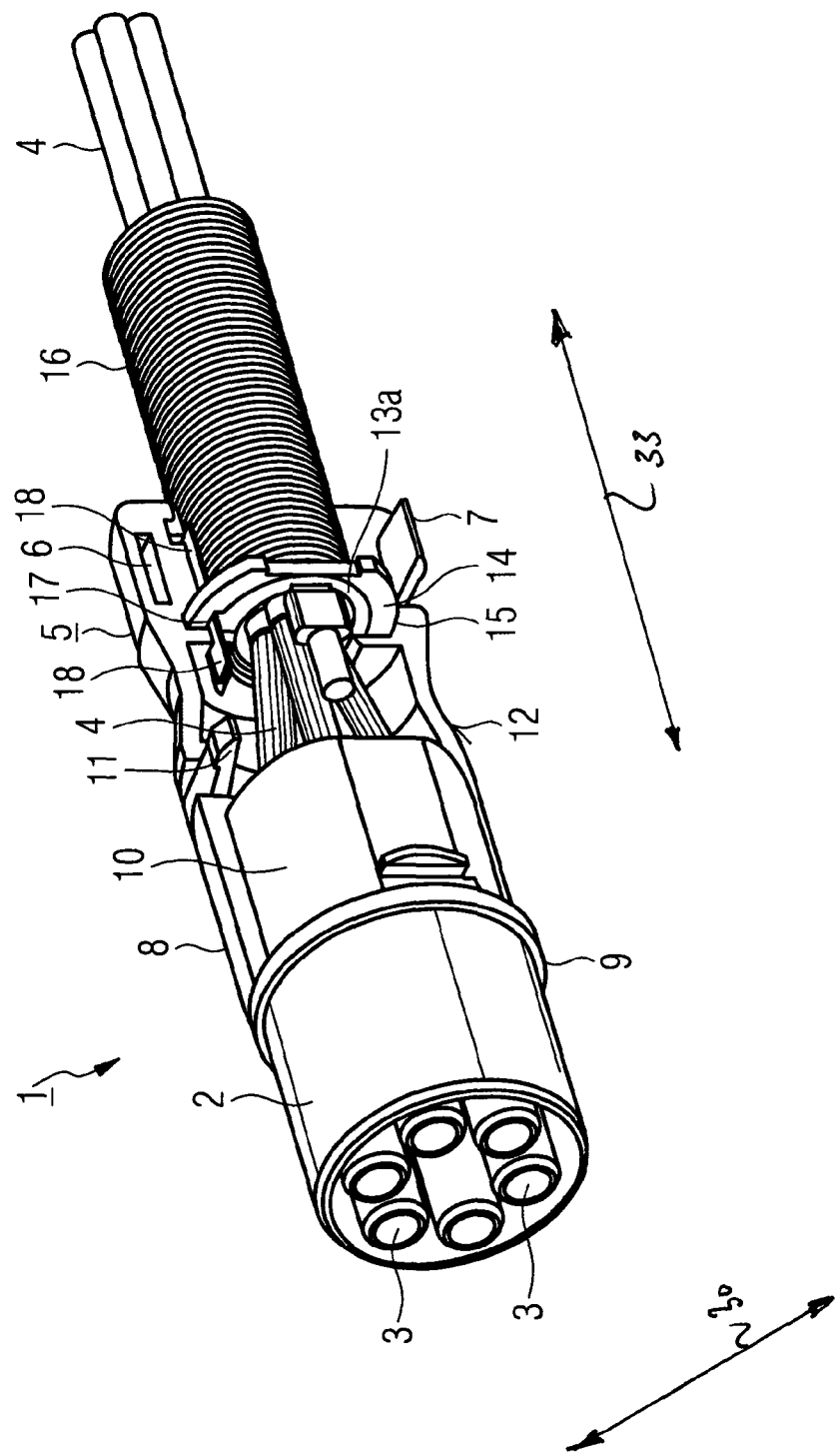
FIG. 2 is a perspective view according to FIG. 1 of the electrical plug connector, showing a view into the housing half-shell with a grounding contact which engages through a securing element.

FIG. 2 illustrates in perspective the plug connector 1 with the socket contact openings 3, the conductors 4, the housing half-shell 5, the latching opening 6 and the latching hooks 7, 11. The adaptor part 13 has here merely a securing element 13a. The latter is provided with a continuous slot 17 through which a grounding contact 18 engages. The securing element 13a supports or forms the securing collar 14 which engages in the housing groove 15 facing the socket contact openings 3. The securing element 13a in turn engages around the sleeve line 16 and rests on the sleeve line 16 on the end side.

Figure 3:
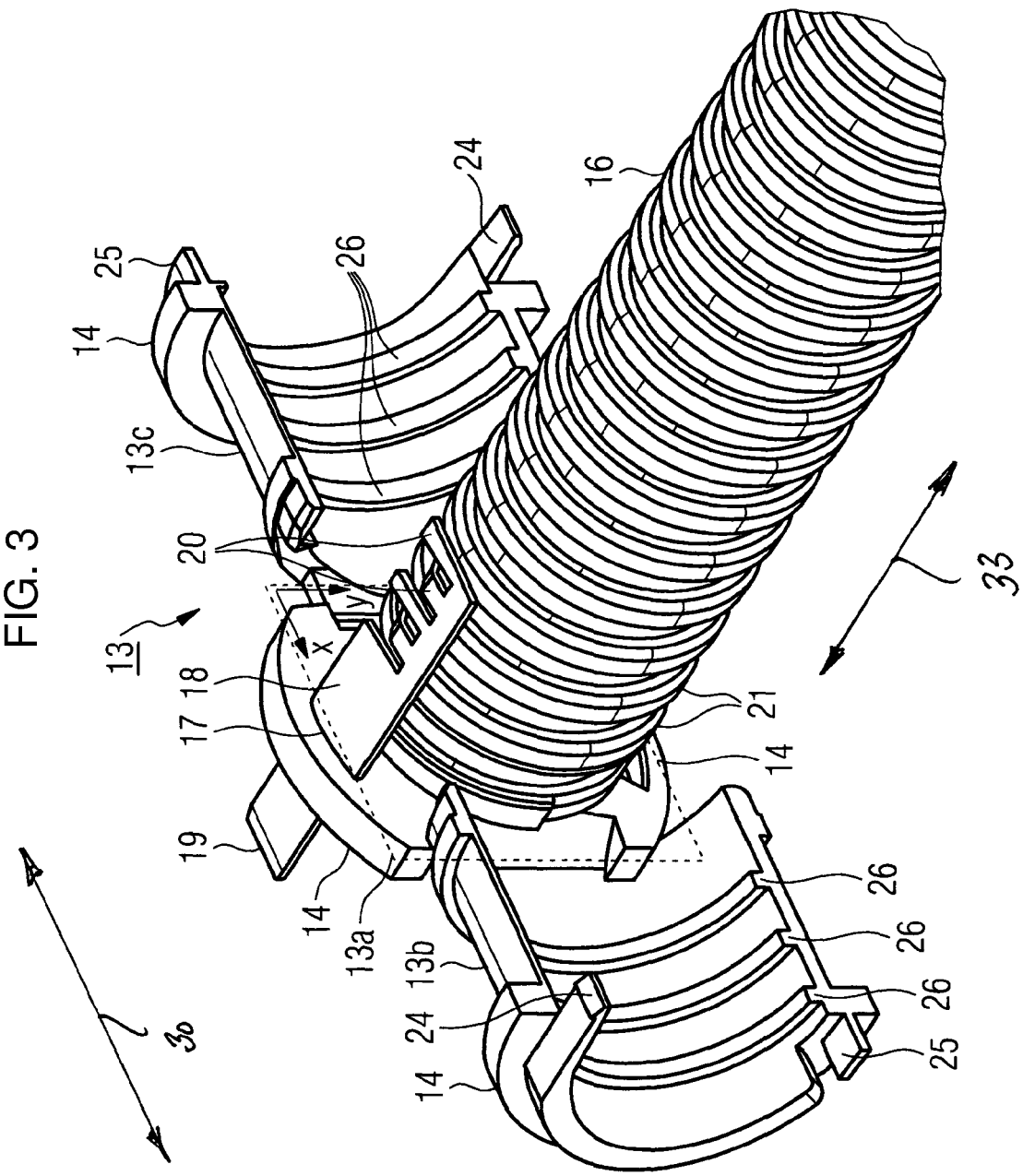
FIG. 3 is a perspective view of the adaptor part with two folded-over adaptor half-shells and the grounding contact which engages in the sleeve line.
Figure 4:
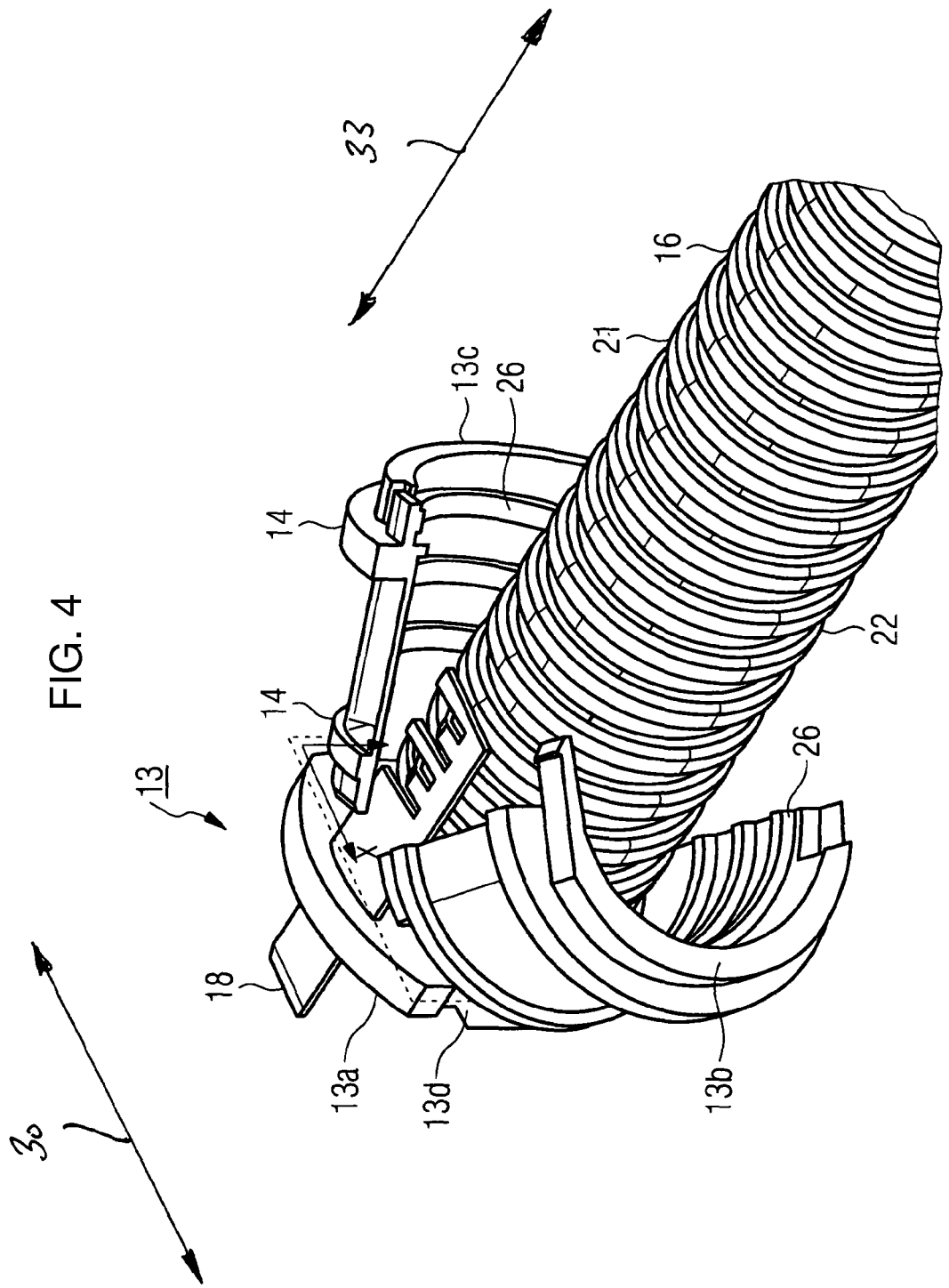
FIG. 4 is a perspective view according to FIG. 3 of the adaptor part with two semi-enclosed adaptor half-shells and with the grounding contact which engages in the sleeve line.
Figure 5:
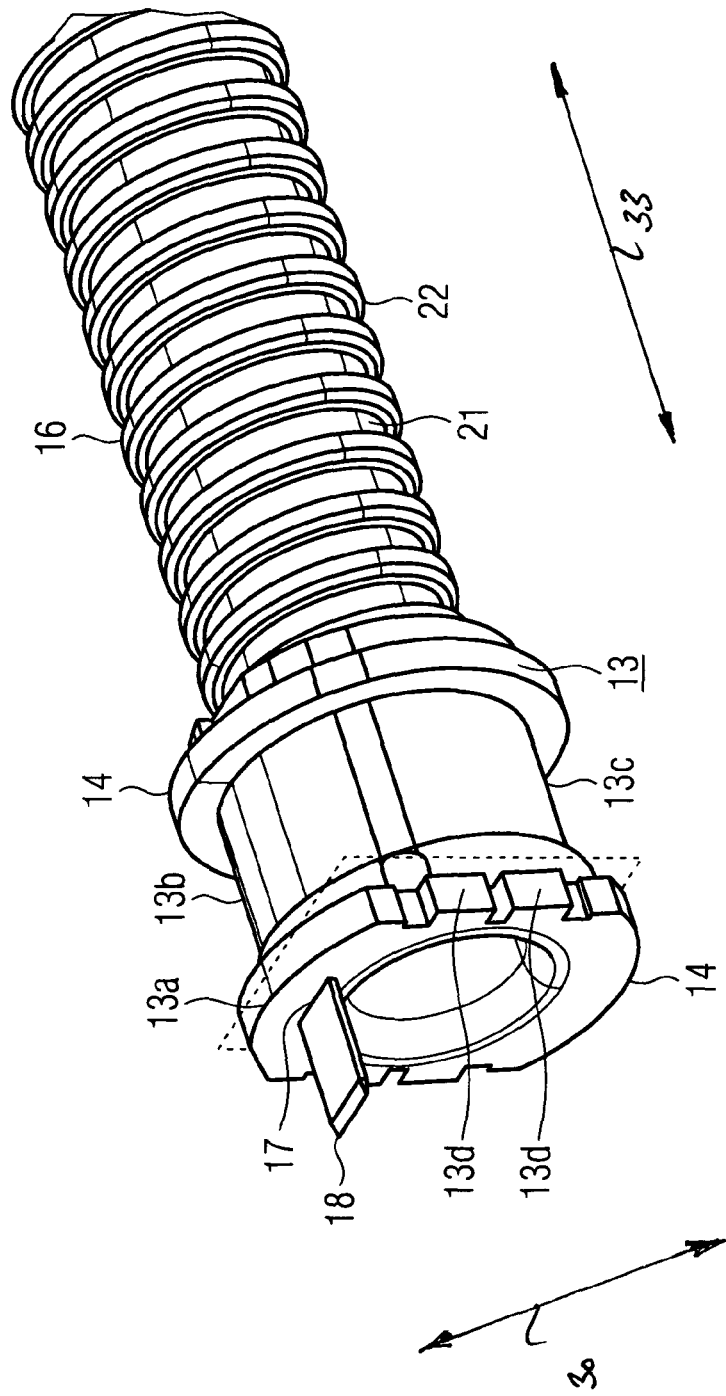
FIG. 5 is a perspective view, showing an end side of the enclosed adaptor part with a grounding contact projecting out and with the adaptor half-shells which are coupled in an articulated fashion to the securing element and enclose the sleeve line.

As is comparatively clearly apparent in FIGS. 3 to 5, a contact lug 19 of the grounding contact 18 projects beyond the securing element 13a of the adaptor part 13, and on the side facing away from the sleeve line 16 the contact lug 19 projects into the housing 5 of the electrical plug connector 1. The grounding contact 18 has comb-like securing and/or contact claws 20. These are provided at the contact end, lying opposite the contact lug 19, of the grounding contact 18. With each second contact claw 20, the grounding contact 18 engages in corresponding corrugation valleys 21, while the securing claws 20 which alternate with the latter rest on corrugation peaks 22 of the sleeve line 16, preferably while applying a pressure force.

The grounding contact 18 permits an electrically conductive connection of the then electrically conductive sleeve line 16, which is embodied, for example, as a metal tube for this purpose, with a grounding contact 23 (FIG. 1) and/or with the then metallic or electrically conductive housing half-shells 5 (FIG. 2) of the electrical plug connector 1. As a result of the locking of the securing or contact claws 20 of the grounding contact 18 in the corresponding surface structure of the sleeve line 16, the sleeve line 16 is also secured against rotation.

The adaptor part 13 has two adaptor half-shells 13b and 13c. The latter are coupled in an articulated fashion to the securing element 13a via film hinges 13d (FIGS. 4 and 5) and therefore, as is shown in FIGS. 3 to 5, they can be pivoted against the sleeve line 16 and latched to one another in the closed state. For this purpose, the cylindrical half-shells 13b, 13c of the adaptor part 13 have latching hooks 24 and corresponding latching webs 25 on the opposite side. In the latched state according to FIG. 5, the latching hook 24 of the one half-shell 13b engages behind the latching web 25 of the other half-shell 13c. The latching hooks 24 of the half-shell 13b engages correspondingly behind the latching web 25 of the half-shell 13b. The securing element 13a is embodied with corresponding flat sides onto which the film hinges 13d and the adaptor half-shells 13b and 13c are integrally formed.

The adaptor half-shells 13b, 13c and therefore the adaptor part 13 itself have circumferential webs 26 which run around on the inside. In the assembled state according to FIG. 5, the circumferential webs 26 engage in the corrugation valleys 21 of the sleeve line 16. As a result, the inner structure of the adaptor part 13 is matched to the outer structure of the sleeve line 16. In addition, the inner diameter of the adaptor part 13 is matched as free of play as possible to the outer diameter of the sleeve line 16 when the adaptor half-shells 13b, 13c are closed. The formation of the form-locking connection between the adaptor part 13 and the sleeve line 16 by the circumferential webs 26 on the inside causes the sleeve line 16 to be reliably secured by the adaptor part 13. As a result of the form-locking securement of the adaptor part 13 in the housing 5 of the electrical plug connector 1, the sleeve line 16 is securely held on the adaptor part 13, wherein the adaptor part 13 is effective as a tensile strain relief.

The adaptor part 13 is always the same in terms of its outer diameter and its outer structure. For the purpose of adaption to different sleeve lines 16 with different outer diameters and outer structures, the adaptor part 13 is merely embodied in a correspondingly different way on the inside. Therefore, for different sleeve lines 16 all that is necessary is to make available correspondingly matched adaptor parts 13, while the electrical plug connector 1 is otherwise always the same.

Figure 6:
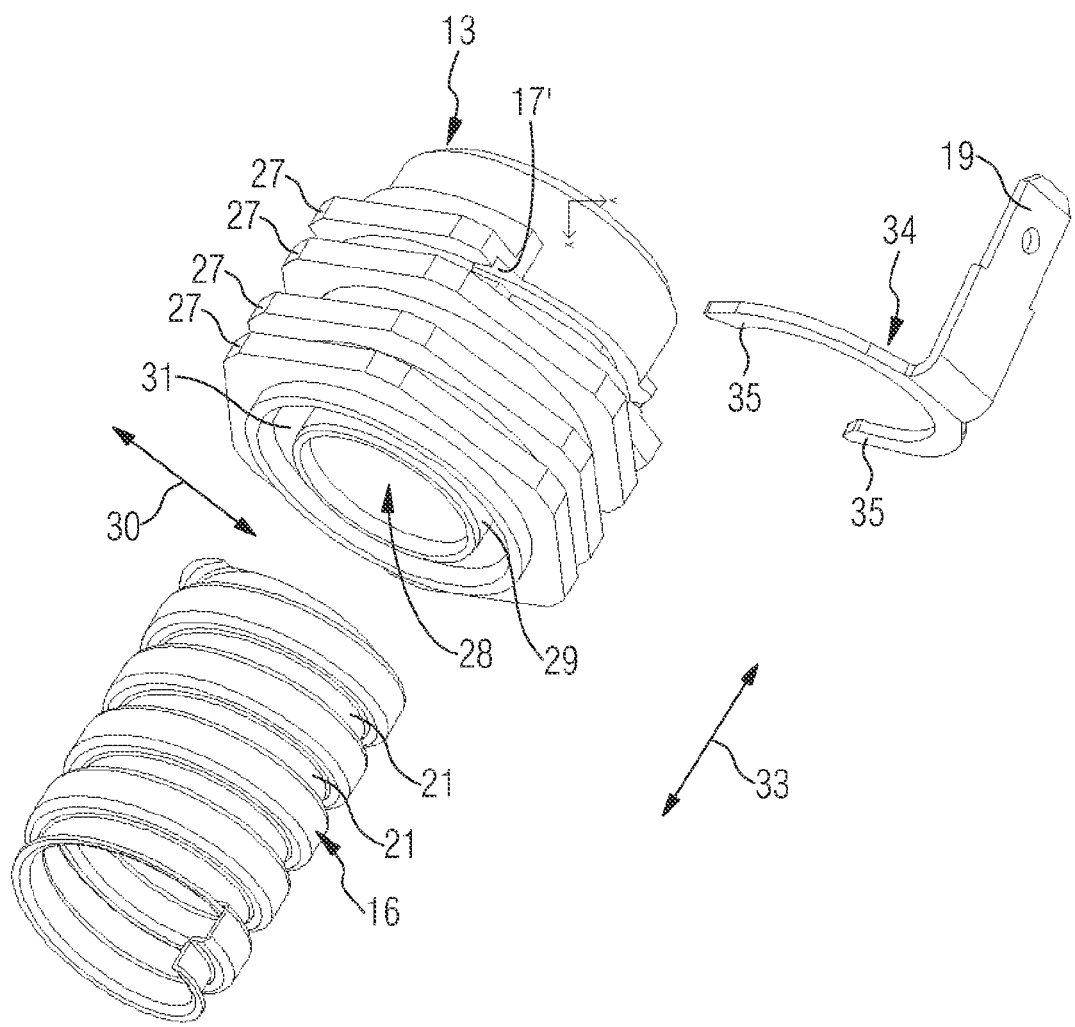
FIG. 6 is a perspective, exploded view of a further embodiment of the adaptor with a sleeve line which is to be connected thereto.
Figure 7:
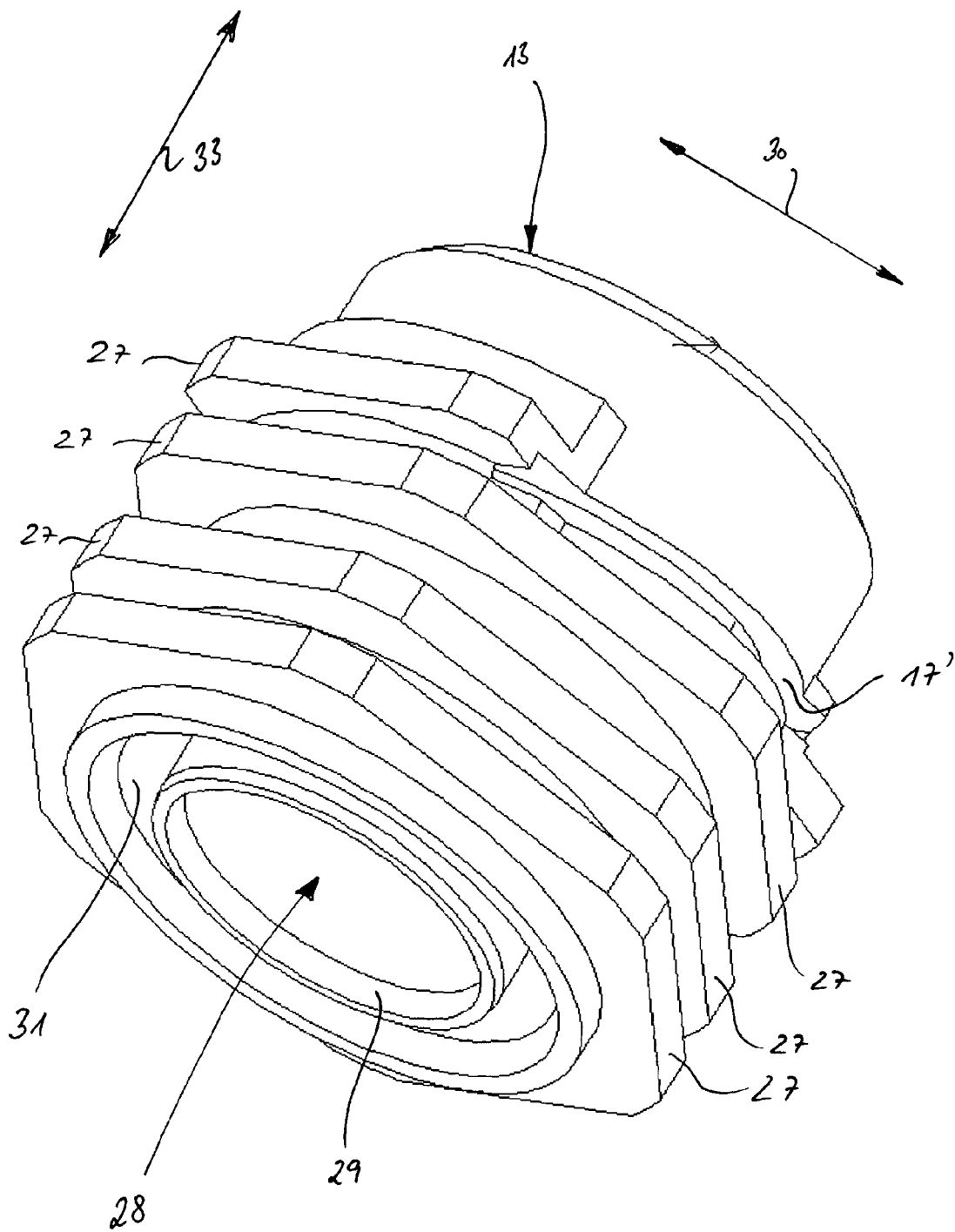
FIG. 7 is a perspective view of the adaptor part illustrated in FIG. 6.
Figure 8:
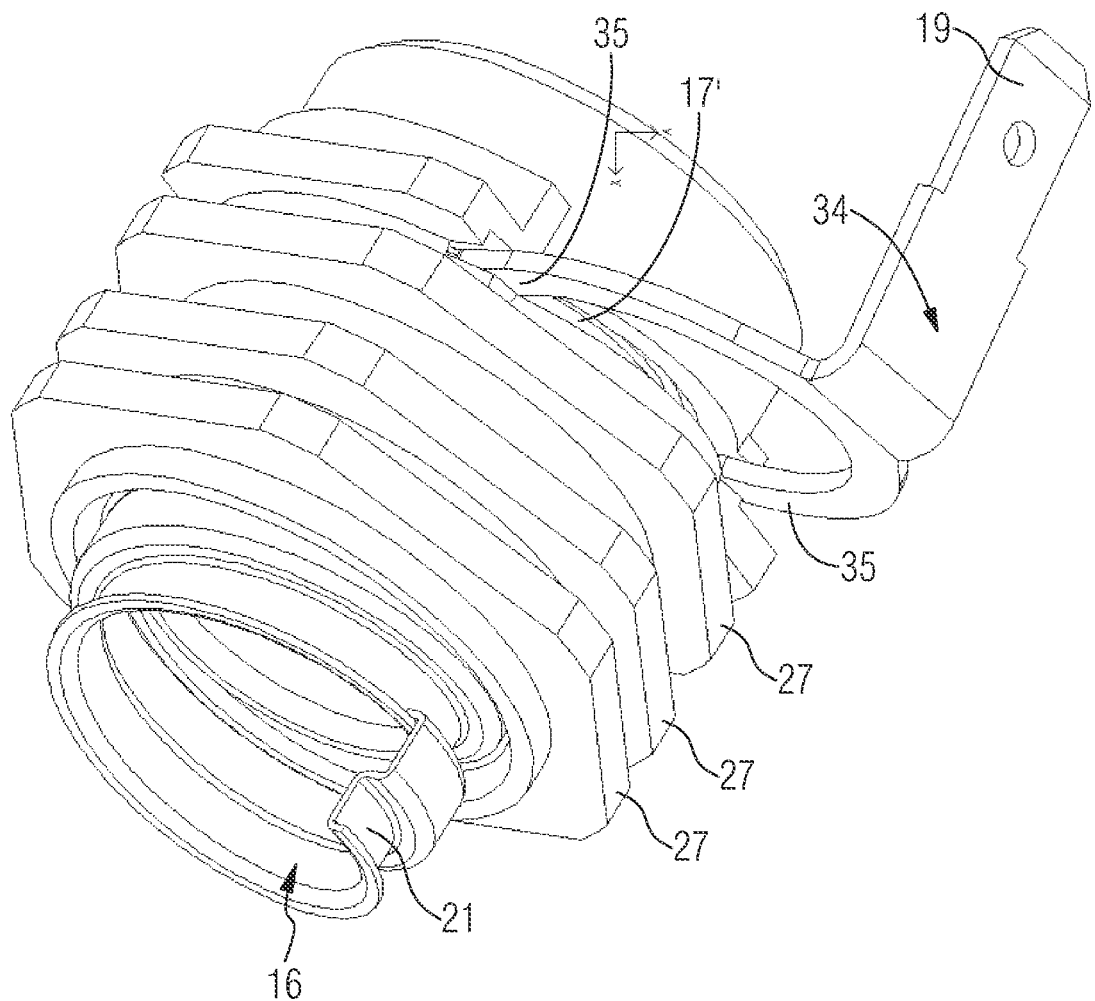
FIG. 8 is a perspective view of the adaptor part which is illustrated in FIG. 7 and has an inserted sleeve line and partially inserted securing clamp.
Figure 9:
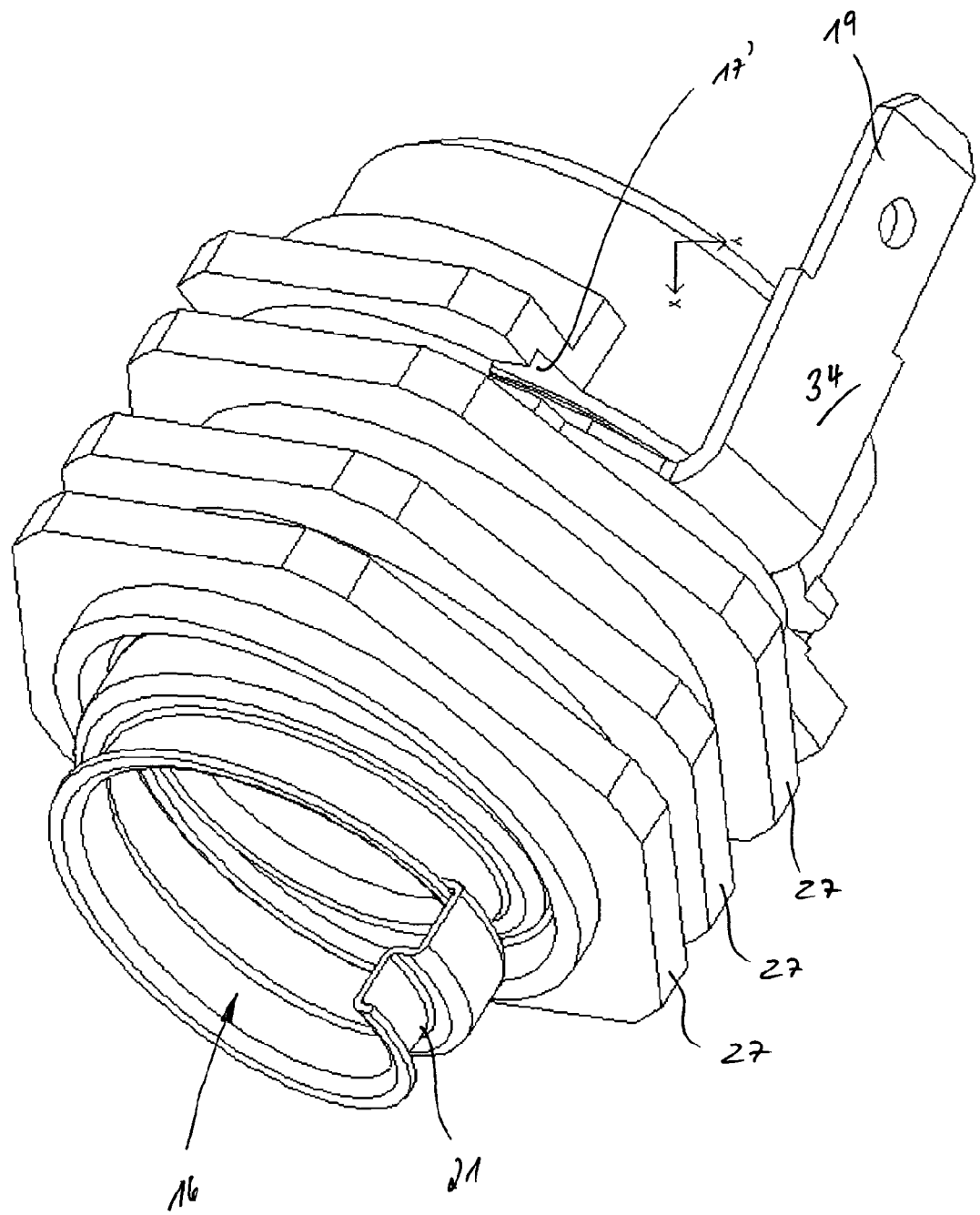
FIG. 9 is a perspective view according to FIG. 8 with a completely inserted securing clamp.
Figure 10:
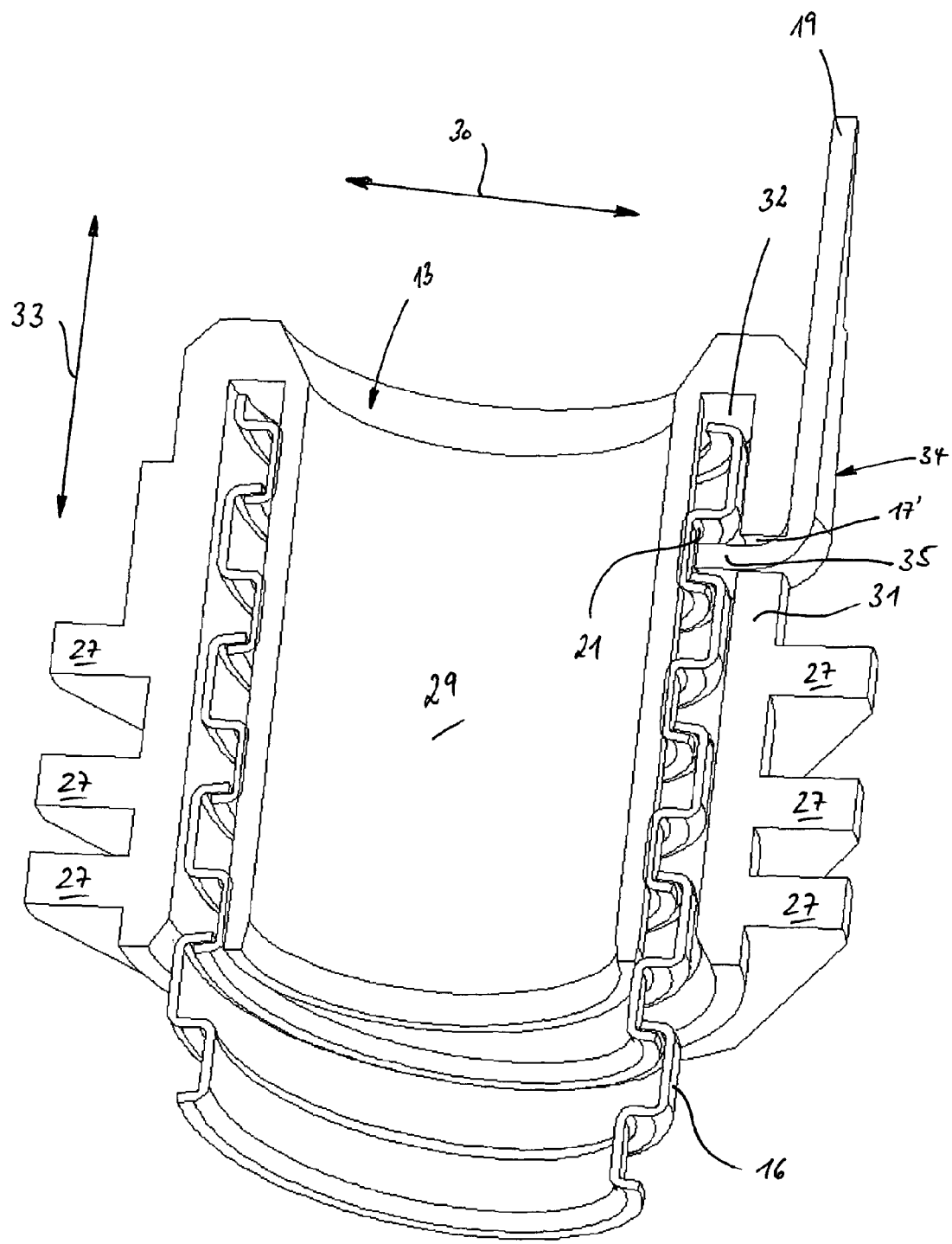
FIG. 10 is a sectional view through the adaptor and the sleeve line with the securing clamp completely inserted.

The further embodiment illustrated in FIG. 6 to FIG. 10 shows the adaptor part 13 without the contact carrier part 2. This embodiment is also to be understood such that in order to implement the electrical plug connector the adaptor part 13 is in turn inserted into the contact carrier part 2. The adaptor part 13 which is illustrated in FIG. 6 has outer ribs 27 on its outer casing. The adaptor part 13 has a hollow-cylindrical accommodation space 28. A supporting cylinder 29 projects into the hollow-cylindrical accommodation space 28. In a radial direction 30 of the adaptor part 13, the supporting cylinder 29 is at a lateral distance from the inner face of an outer wall 31 of the adaptor part 13. This lateral distance in the radial direction 30 between the outer face of the supporting cylinder 29 and the inner face of the outer wall 31 of the adaptor part 13 serves to form an accommodation pocket 32 for the sleeve line 16 in the adaptor part 13.

In order to assemble the adaptor part 13 according to FIG. 6 to FIG. 10, the sleeve line 16 is first inserted into an accommodation pocket 32 in the axial direction 33 of the adaptor part 13. As soon as the sleeve line 16 lies completely in the accommodation pocket 32 (FIGS. 8-10), a fork-like securing clamp 34 is inserted in the radial direction 30 into the adaptor part 13 through a continuous slot 17' in the outer wall of the adaptor part 13. The fork projections 35 of the fork-like securing clamp 34 engages, in the final assembled state, in one of the corrugation valleys 21 of the sleeve line 16 which is configured as a corrugated tube. The fork-like securing clamp 34 also has the contact lug 19 which is bent over in an angled shape in the axial direction 33 away from the fork projections 34. In the case of a metallic sleeve line 16, the contact lug 19 serves at the same time as a grounding contact, as do the fork projections 35 which engage on the sleeve line 16.

The sleeve line 16 is secured in a form-locking fashion to the adaptor part 13 with the aid of the fork projections 35 of the securing clamp 34 which engages in the corrugation valley 21 which is aligned with the fork projections 35 in the radial direction 30. In this context, the supporting cylinder 29 increases the rigidity of the sleeve line 16 from the inside and forms a collar-like securing flange for the sleeve line 16 on the adaptor part 13.

The invention claimed is:

1. An electrical plug connector, comprising:
   a housing for accommodating conductors;
   a sleeve line serving to encase the conductors;
   a fork-shaped securing clamp;
   a grounding contact;
   a separate adaptor part having at least one of:
      an outer contour matched to an inner contour of said housing and an inner structure for connecting said sleeve line; or
      means for accommodating said grounding contact
   said adaptor part having a side wall and a hollow-cylindrical accommodation space; and
   said sleeve line having a coiled outer casing or a corrugated-tube-shaped outer casing and engaging in said hollow-cylindrical accommodation space in said adaptor part and said fork-shaped securing clamp penetrating said side wall of said adaptor part and engaging in a form locking connection with said sleeve line.

2. The electrical plug connector according to claim 1, wherein said adaptor part has structure elements on an inside for forming at least one of a form locking connection or a frictionally locking connection to said sleeve line.

3. The electrical plug connector according to claim 1, wherein said adaptor part has contour elements on an outside for forming at least one of a form locking connection or frictionally locking connection to said housing.

4. The electrical plug connector according to claim 1, wherein said housing contains a contact carrier part having openings formed therein for receiving conductor-end-side connecting contacts and two housing half-shells which are joined in an assembled state to said contact carrier part.

5. The electrical plug connector according to claim 4, wherein said housing half-shells each have at least one latching element for latching to one another.

6. The electrical plug connector according to claim 5, wherein each of said housing half-shells has a latching hook and a latching opening formed therein which lies radially opposite said latching hook of a respective other one of said housing half-shells.

7. The electrical plug connector according to claim 4, wherein said housing half-shells accommodate said adaptor part.

8. The electrical plug connector according to claim 1, further comprising a supporting cylinder which is at a lateral distance from an outer wall of said hollow-cylindrical accommodation space in said adaptor part and said supporting cylinder projecting into said hollow-cylindrical accommodation space in such a way that a circumferential accommodation pocket for said sleeve line is formed between an inner face of said outer wall of said hollow-cylindrical accommodation space and an outer face of said supporting cylinder.

9. The electrical plug connector according to claim 1, wherein said adaptor part has two adaptor half-shells.

10. The electrical plug connector according to claim 9, wherein said adaptor half-shells have complementary latching elements.

11. The electrical plug connector according to claim 9, wherein said adaptor part has an end-side securing element.

12. The electrical plug connector according to claim 11, wherein said two adaptor half-shells are coupled to said end-side securing element.

13. The electrical plug connector according to claim 1, wherein said adaptor part has a connecting opening formed therein, said grounding contact engages through said connecting opening in said adaptor part.

14. The electrical plug connector according to claim 1, wherein said grounding contact engages in a structure of said sleeve line.

15. The electrical plug connector according to claim 1, wherein said grounding contact is embodied in a manner of a comb at an end facing said sleeve line and having claws which can be bent over.

16. The electrical plug connector according to claim 15, wherein said claws engage in a manner of a comb in an outer structure of said sleeve line, and in the assembled state said grounding contact is pressed onto said sleeve line.

17. The electrical plug connector according to claim 10, wherein said complementary latching elements include a latching hook and a latching web for latching to one another.

18. The electrical plug connector according to claim 15, wherein said claws engage in a manner of a comb in an outer structure of said sleeve line.

19. The electrical plug connector according to claim 15, wherein in the assembled state said grounding contact is pressed onto said sleeve line.

* * * * *